Nov. 13, 1928.

A. VAUPEL 1,691,316

METHOD OF PROTECTING HIGH TENSION LINES AGAINST FLASHOVERS

Filed Feb. 26, 1925

WITNESSES:
R.S. Williams
E.R. Evans

INVENTOR
Albert Vaupel
BY
Wesley G. Carr
ATTORNEY

Patented Nov. 13, 1928.

1,691,316

UNITED STATES PATENT OFFICE.

ALBERT VAUPEL, OF BERLIN-GRUNEWALD, GERMANY, ASSIGNOR TO WESTINGHOUSE ELECTRIC & MANUFACTURING COMPANY, OF NEW YORK, N. Y., A CORPORATION.

METHOD OF PROTECTING HIGH-TENSION LINES AGAINST FLASHOVERS.

Application filed February 26, 1925, Serial No 11,899, and in Germany February 27, 1924.

My invention relates to improvements in methods of, and apparatus for, protecting high-tension distribution systems.

An object of my invention is to diminish the danger of flashover between the line conductors of a high-tension distribution system and ground when abnormal potentials obtain therein.

It has been found when the potential between two rounded conductors is increased until a flashover occurs, that the initial ionization takes place at the positive conductor. If the positive conductor is provided with points or sharp edges, a corona discharge takes place but flashover does not occur until a higher potential difference is reached. It is undesirable, however, to utilize the increased corona discharge to prevent flashover because of the loss of energy entailed where the conductors are of considerable length.

According to my invention, the tendency to flashover is minimized by reducing the maximum instantaneous value of the positive cycle of the alternating current with respect to the ground potential. This may be accomplished either by transposing the axis of the alternating-current wave or by generating an alternating potential of which the negative wave has a higher peak value than the positive wave.

For a better understanding of my invention, reference may be had to the accompanying drawing wherein Fig. 1 is a diagrammatic view of an electrical system embodying my invention;

Figure 1:
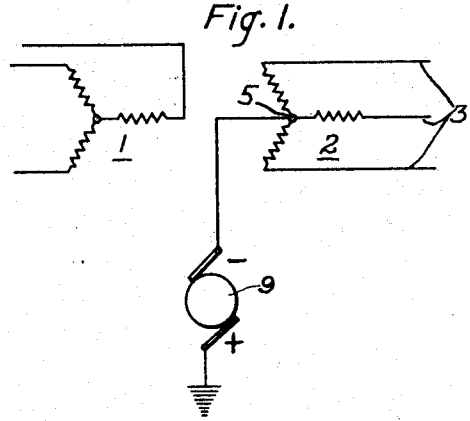
Figure 2:
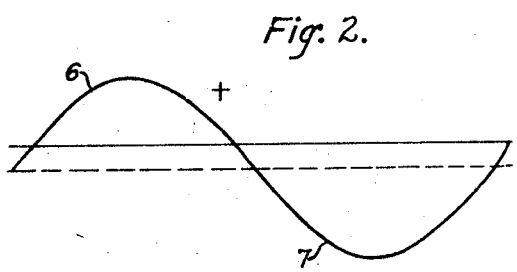
Fig. 2 is a graph illustrating the potential relations in the system shown in Fig. 1.

Referring to Fig. 1, an electrical distribution system is shown comprising a step-up transformer having polyphase primary and secondary windings 1 and 2, respectively. The secondary windings 2 are connected in star relation to the conductors 3 of the high-tention transmission circuit. The neutral point 5 of the secondary windings 2 is connected to the negative terminal of a direct-current generator 9, the positive terminal of the generator being connected to ground. The neutral point is, therefore, at a negative potential with respect to ground so that the axis of the alternating potential of the conductors 3 is displaced as shown in Fig. 2 in such a manner that the amplitude of the positive half-cycle of voltage 6 is smaller than the amplitude of the negative half-cycle of voltage 7. It will be noted that, except for leakage currents which flow over the line insulators, the line is not connected to ground at any point other than the direct-current generator. Hence, the current (leakage current) supplied to the line through the transformer by the direct-current generator is negligibly small and there will be no trouble due to saturation in the transformer.

Figure 3:
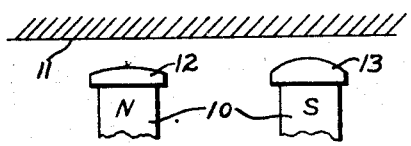
Fig. 3 is a diagrammatic view of the field structure of an alternator adapted for carrying out the invention.
Figure 4:
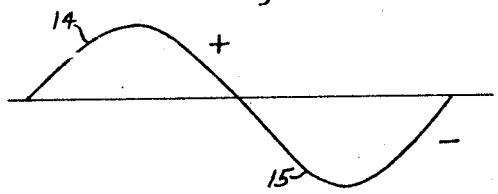
Fig. 4 is a graph illustrating the voltage wave produced by the alternator shown in Fig. 3.

Similar results may be obtained by generating a non-symmetrical potential. For example, as indicated in Fig. 3, the successive poles 10 of an alternator may be arranged to induce unequal potentials in the conductors (not shown) imbedded in a stator 11. This result may be accomplished by so shaping the pole tips 12 and 13 of the pole pieces that the magnetic circuit including the pole piece 12 has a greater reluctance than that including the pole piece 13. The alternating potential produced by a generator of this construction is shown in Fig. 4, the magnitude of the positive half-cycle of potential 14 being smaller than the magnitude of the negative half-cycle of potential 15.

While I have described several modifications of my invention, by way of example, it will be understood that the invention may be carried out by other means as will be obvious to those skilled in the art.

I claim as my invention:

1. The method of protecting high-tension electrical distribution systems aganst flashover which consists in reducing the magnitude of the positive half-cycle of potential with respect to the magnitude of the negative half-cycle of potential.

2. An alternating-current protective system comprising line conductors, and means for preventing line flashover including a star-connected device connected to said line conductors and a direct-current source of potential having its negative terminal connected to the neutral of the star-connected device and having its positive terminal connected to ground.

3. The combination with an alternating-current line, of means for preventing line flashover including means for reducing the magnitude of the positive half-cycle with respect to the magnitude of the negative half-cycle of voltage.

4. The combination with an alternating-current line, of means for preventing line flashover including means for reducing the magnitude of the positive half-cycle with respect to the magnitude of the negative half-cycle of voltage, the last-named means including a substantially unloaded source of direct-current potential.

In testimony whereof I affix my signature.

ALBERT VAUPEL.